United States Patent
Tan et al.

(10) Patent No.: US 12,187,209 B2
(45) Date of Patent: Jan. 7, 2025

(54) CONNECTION STRUCTURE OF BATTERY PACK AND VEHICLE BODY, AND VEHICLE

(71) Applicant: HONDA MOTOR CO., LTD., Tokyo (JP)

(72) Inventors: Zhanyang Tan, Guangdong (CN); Nobuo Aizawa, Guangdong (CN); Mubin Guo, Guangdong (CN)

(73) Assignee: HONDA MOTOR CO., LTD., Tokyo (JP)

( * ) Notice: Subject to any disclaimer, the term of this patent is extended or adjusted under 35 U.S.C. 154(b) by 78 days.

(21) Appl. No.: 18/142,054

(22) Filed: May 2, 2023

(65) Prior Publication Data

US 2023/0382330 A1    Nov. 30, 2023

(30) Foreign Application Priority Data

May 30, 2022    (CN) .......................... 202210603308.X

(51) Int. Cl.
*B60R 16/04*    (2006.01)
*B62D 21/03*    (2006.01)

(52) U.S. Cl.
CPC .............. *B60R 16/04* (2013.01); *B62D 21/03* (2013.01)

(58) Field of Classification Search
CPC ........ B62D 21/00; B62D 25/20; B60R 16/04; B60K 2001/0438; B60K 2001/0472; B60K 1/04

USPC .................................................. 180/311, 312
See application file for complete search history.

(56) References Cited

U.S. PATENT DOCUMENTS 11,088,416 B2 *   8/2021   Popovski ............ H01M 50/242
11,548,363 B2 *   1/2023   Kumagai ............... B62D 21/09

FOREIGN PATENT DOCUMENTS

CN    218616868 U   *   3/2023
CN    219843070 U   *   10/2023
CN    220053491 U   *   11/2023

* cited by examiner

*Primary Examiner* — Paul N Dickson
*Assistant Examiner* — Caitlin Anne Miller
(74) *Attorney, Agent, or Firm* — Amin, Turocy & Watson, LLP

(57) ABSTRACT

A connection structure of a battery pack and a vehicle body including a left stringer, a right stringer, and a crossbeam, includes at least a first connection member configured to connect the battery pack and the crossbeam. The first connection member includes a first inclination plate and a second inclination plate arranged at intervals along a left-right direction, the first inclination plate is positioned at a side of the second inclination plate to be close to the right stringer, one end of each of the first inclination plate and the second inclination plate is connected to the crossbeam, and the other end of each of the first inclination plate and the second inclination plate is connected to the battery pack, a first/second extension plane of the first/second inclination plate that is the closest to the right/left stringer intersects the right/left stringer.

12 Claims, 8 Drawing Sheets

CONNECTION STRUCTURE OF BATTERY PACK AND VEHICLE BODY, AND VEHICLE

CROSS-REFERENCE TO RELATED APPLICATION

The priority is claimed based on Chinese Patent Application No. 202210603308.X, filed May 30, 2022. The content of the Chinese Patent Application is incorporated herein by reference.

TECHNICAL FIELD

The present disclosure relates to a technical field of a vehicle. More specifically, the present disclosure relates to a connection structure of a battery pack and a vehicle body, and a vehicle.

RELATED ART

A body of a vehicle generally includes a left stringer and a right stringer, and a crossbeam connecting the two stringers. Generally, a rear end of a battery pack of the current vehicle and a crossbeam of a vehicle body are connected with each other by using two rectangular connection members. A front end of the rectangular connection member is connected with the battery pack, and a top portion of the rectangular connection member is generally connected to the crossbeam by bolts. However, in such a structure, a side plate of the rectangular connection member is nearly perpendicular to the force from the stringer such that it is easy for an out-of-plane deformation occurred in a connection portion of the crossbeam and the rectangular connection member.

SUMMARY

In consideration of the above circumstances, an object of the present disclosure is to provide a connection structure of a battery pack with a vehicle body, and a vehicle so as to prevent the out-of-plane deformation from occurring in the connection portion of the crossbeam and the rectangular connection member when connecting the battery pack and the vehicle body crossbeam using the rectangular connection member.

According to an aspect of the present disclosure, a connection structure of a battery pack and a vehicle body is provided, wherein the vehicle body includes a left stringer, a right stringer, and a crossbeam and the left stringer and the right stringer are connected to two ends of the crossbeam. The connection structure of a battery pack and a vehicle body includes at least a first connection member configured to connect the battery pack and the crossbeam, wherein the first connection member includes a first inclination plate and a second inclination plate arranged at intervals along a left-right direction, the first inclination plate is positioned at a side of the second inclination plate to be close to the right stringer, one end of each of the first inclination plate and the second inclination plate is connected to the crossbeam, and the other end of each of the first inclination plate and the second inclination plate is connected to the battery pack, a first extension plane of the first inclination plate that is the closest to the right stringer intersects the right stringer, and a second extension plane of the second inclination plate that is the closest to the left stringer intersects the left stringer.

According to the above-described aspect, the extension surface of the first inclination plate at the most right side intersects the right stringer so as to make the force from the right stringer to be approximately on the same plane of the first inclination plate at the most right side to reduce the out-of-plane deformation of the first inclination plate and cause the force from the right stringer to approximately generate the in-plane deformation with respect to the first inclination plate at the most right side to ensure the suitable stability of the first inclination plate. Similarly, the extension surface of the second inclination plate at the most left side intersects the left stringer so as to make the force from the left stringer to be approximately on the same plane of the second inclination plate at the most left side to reduce the out-of-plane deformation of the second inclination plate and cause the force from the left stringer to approximately generate the in-plane deformation with respect to the second inclination plate at the most left side to ensure the suitable stability of the second inclination plate. Accordingly, it is possible to further ensure the stability of the connection of the battery pack and the vehicle body.

According to an optional aspect, a longitudinal cross section of the first connection member maybe an approximately triangular shape, and a length of the first connection member along the left-right direction may be set to be gradually decreased in a direction from the crossbeam toward the battery pack.

According to the above-described aspect, the horizontal length of the first connection member is gradually decreased along the direction from the crossbeam toward the battery pack to make the first connection member to have the approximately triangular shape as viewed from the longitudinal direction such that it is further difficult for the first connection member to be deformed and the structure becomes more stable.

According to an optional aspect, at least two of the first connection members may be provided, and ends of the two adjacent first connection members being close to the crossbeam may be arranged with an interval therebetween.

According to the above-described aspect, the first connection members are set to be two so as to reduce the dimension and the weight of each first connection member to facilitate the processing and manufacturing while reducing the weight of the vehicle body. The ends of the two adjacent first connection members being close to the crossbeam are arranged with an interval therebetween to make the two first connection members to be further closer to the crossbeam and the left end and the right end of the battery pack so as to make the left side and the right side of the battery pack to communicate with the left end and right end of the crossbeam respectively to make the battery pack and the crossbeam to receive the force more uniformly and connect the battery pack with the crossbeam more stably.

According to an optional aspect, at least two of the first connection members may be provided, and ends of the two adjacent first connection members being close to the crossbeam may be arranged to be adjacent to each other.

According to the above-described aspect, the first connection members are set to be two so as to reduce the dimension and the weight of each first connection member to facilitate the processing and manufacturing while reducing the weight of the vehicle body. The ends of the two adjacent first connection members being close to the crossbeam may be arranged to be adjacent to each other such that a gap between the two first connection members forms an approximately triangular shape so as to not only provide a certain space for the installation, but also increase the structural stability.

According to an optional aspect, a horizontal cross section of the first connection member passing through a center in a length direction of the crossbeam may be symmetrically distributed.

According to the above-described aspect, the first connection members are symmetrically distributed and the force receiving is more balanced so as to further improve the structural stability and ensure the structural strength and the stability of the vehicle body.

According to an optional aspect, the first connection member may include a first bottom sticking plate for sticking to a bottom surface of the crossbeam to be fixed thereto, and the first bottom sticking plate being provided to extend in a direction from the end of the first inclination plate being close to the crossbeam to be separated from the second inclination plate, and/or the first connection member may include a second bottom sticking plate for sticking to the bottom surface of the crossbeam to be fixed thereto, and the second bottom sticking plate being provided to extend in a direction from the end of the second inclination plate being close to the crossbeam to be separated from the first inclination plate By providing the first bottom sticking plate, it is possible to increase the contact area of the first connection member and the crossbeam so as to increase the area of the crossbeam for receiving the force, disperse the force receiving points, and reduce the stress concentration, thus to increase the structural stability. By providing the second bottom sticking plate, it is possible to increase the contact area of the first connection member and the crossbeam so as to increase the area of the crossbeam for receiving the force, Disperse the force receiving points, and reduce the stress concentration, thus increase the structural stability.

According to an optional aspect, the first connection member may further include a first vertical plate, a left end and a right end of the first vertical plate being communicated with a front side of the second inclination plate and a front side of the first inclination plate, respectively, and/or the first connection member may further include a second vertical plate, a left end and a right end of the second vertical plate being communicated with a rear side of the second inclination plate and a rear side of the first inclination plate, respectively.

By providing the first vertical plate and connecting the left side and right side of the first vertical plate with the front side of the second inclination plate and the front side of the first inclination plate, respectively, it is possible to increase the structural strength of the first connection member so as to connect the battery pack and the crossbeam more stably and increase the structural strength of the vehicle body. Similarly, by providing the second vertical plate and connecting the left side and right side of the second vertical plate with the rear side of the second inclination plate and the rear side of the first inclination plate, respectively, it is possible to increase the structural strength of the first connection member so as to connect the battery pack and the crossbeam more stably and increase the structural strength of the vehicle body.

According to an optional aspect, the first connection member may further include a first sticking plate for sticking to a front surface of the crossbeam to be fixed thereto, a lower side of the first sticking plate being adjacent to the first vertical plate and the first vertical plate being on the same plane with the first sticking plate, and/or the first connection member may further include a second sticking plate for sticking to a rear surface of the crossbeam to be fixed thereto, a lower side of the second sticking plate being adjacent to the second vertical plate and the second vertical plate being on the same plane with the second sticking plate.

By arranging the first vertical plate and the first sticking plate on the same plane, it is not only easy to perform the processing and the manufacturing, but also when the force by the front surface of the crossbeam with respect to the first connection member is transmitted to the first vertical plate via the first sticking plate, it is possible to make the force to be approximately on the same plane with the first vertical plate to cause the in-plane deformation with respect to the first vertical plate to ensure the suitable stability of the first vertical plate so as to ensure the stability of the first connection member. By arranging the second vertical plate and the second sticking plate on the same plane, it is not only easy to perform the processing and the manufacturing, but also when the force by the rear surface of the crossbeam with respect to the second connection member is transmitted to the second vertical plate via the second sticking plate, it is possible to make the force to be approximately on the same plane with the second vertical plate to cause the in-plane deformation with respect to the second vertical plate to ensure the suitable stability of the second vertical plate so as to ensure the stability of the second connection member.

According to an optional aspect, the first connection member may further include a first sticking plate for sticking to a front surface of the crossbeam to be fixed thereto, a lower side of the first sticking plate including a first bending portion bending from the bottom surface of the crossbeam toward the front surface of the crossbeam so as to transition thereto, the first bending portion continuing to the first vertical plate, and the first bending portion being provided to stick to the bottom surface and the front surface of the crossbeam to be fixed thereto, and/or the first connection member may further include a second sticking plate for sticking to a rear surface of the crossbeam to be fixed thereto, a lower side of the second sticking plate including a second bending portion bending from the bottom surface of the crossbeam toward the rear surface of the crossbeam so as to transition thereto, the second bending portion continuing to the second vertical plate, and the second bending portion being provided to stick to the bottom surface and the rear surface of the crossbeam to be fixed thereto.

By arranging the first bending portion on the lower side of the first sticking plate, it is possible to stick and fix the first bending portion to a portion from the bottom surface to the front surface of the crossbeam to increase the contact area of the first connection member with the crossbeam so as to increase the area of the crossbeam for receiving the force, disperse the force receiving points, and reduce the stress concentration, thus increase the structural stability. By arranging the second bending portion on the lower side of the second sticking plate, it is possible to stick and fix the second bending portion to a portion from the bottom surface to the rear surface of the crossbeam to increase the contact area of the first connection member with the crossbeam so as to increase the area of the crossbeam for receiving the force, disperse the force receiving points, and reduce the stress concentration, thus increase the structural stability According to an optional aspect, when the first connection member includes a first vertical plate and a distance between the first vertical plate and the rear surface of the battery pack is equal to or smaller than a predetermined distance, a lower end of the first vertical plate may connect to the rear surface of the battery pack, or when the first connection member includes the first vertical plate and the distance between the first vertical plate and the rear surface of the battery pack is larger than the predetermined distance, the connection structure of a battery pack and a vehicle body further may include a second connection member, wherein the lower end of the first vertical plate connects to the second connection member, and the second connection member connects to the rear surface of the battery pack.

According to the above-described configuration, when the distance between the first vertical plate and the rear surface of the battery pack is equal to or smaller than a predetermined distance, it is possible to directly fix and connect the first connection member with the battery pack so as to simplify the structure, facilitate the installation, reduce the cost, and improve the structural strength of the vehicle body. When the distance between the first vertical plate and the rear surface of the battery pack is larger than the predetermined distance, connecting the first connection member with the battery pack via the second connection member increases the compatibility of the connection structure with respect to battery packs with different sizes and the vehicle bodies with different dimensions.

According to an optional aspect, the first connection member may include a hollow structure, and an end of the hollow structure being close to the crossbeam may be open.

According to the above-described configuration, it is possible to reduce the weight of the first connection member by providing the hollow structure so as to reduce the weight of the vehicle body, and by making the end of the hollow structure being close to the crossbeam to be open, it is possible to facilitate the processing and the manufacturing.

According to another aspect of the present disclosure, a vehicle including a battery pack; a vehicle body; and a connection structure of a battery pack and a vehicle body according to any above-described aspect is provided, wherein the vehicle body includes a left stringer, a right stringer, and a crossbeam, the left stringer and the right stringer are connected to two ends of the crossbeam respectively, and the battery pack is connected to the crossbeam via the first connection member.

The above-described vehicle adopts the connection structure of a battery pack and a vehicle body according to the above-described aspects such that it is possible to reduce the out-of-plane deformation of the connection structure to ensure the suitable structural strength and stability of the connection structure so as to make the rear end of the battery pack to be suitably fixed to the crossbeam of the vehicle body to improve the structural strength and stability of the vehicle.

DESCRIPTION OF EMBODIMENTS

Figure 1:
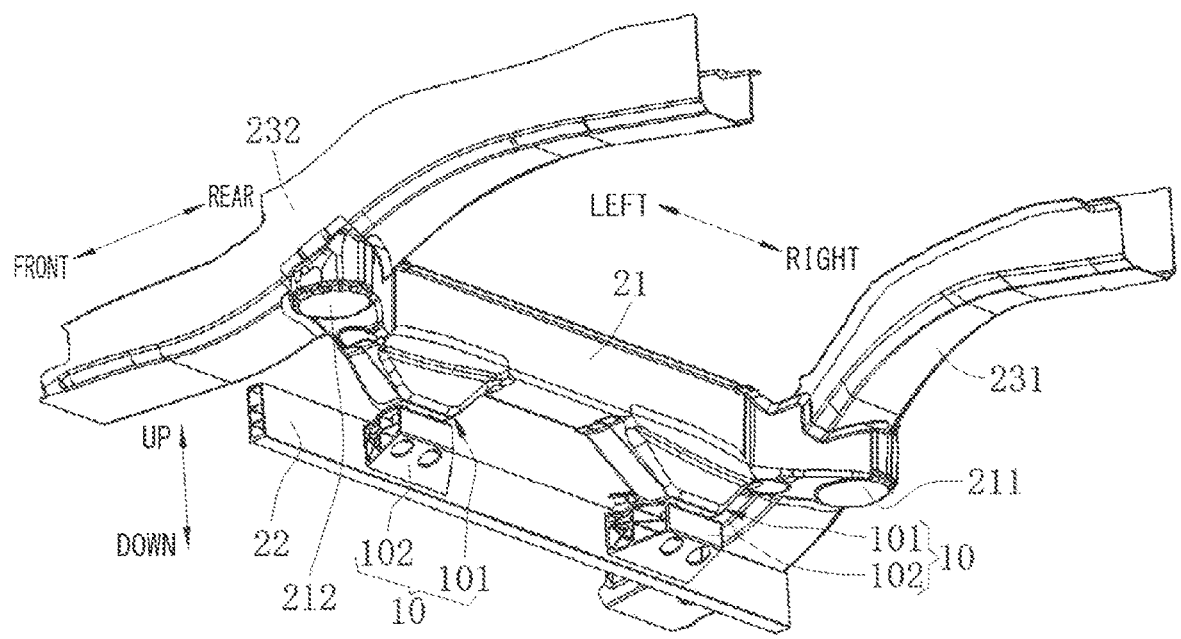
FIG. 1 is a schematic view in a rear view direction showing a three-dimensional structure of a connection structure of a battery pack with a vehicle body connecting the battery pack and a crossbeam according to a first embodiment of the present disclosure.

In order to make the technical solutions according to the embodiments of the present disclosure to be clearly described, hereinafter, the drawings being necessary in the embodiments and examples of the present disclosure will be briefly described. Hereinafter, the configurations described in the drawings in the following embodiments are only specific examples of the present disclosure, and a person with ordinary skill in the art can achieve other drawings based on the enclosed drawings of the present disclosure.

In order to more clearly describe the technical solutions and effects according to the present disclosure, hereinafter, the present disclosure will be further described in details with the drawings and embodiments. It is noted that the specific embodiments described below are only used to explain the present disclosure rather than limiting the present disclosure.

In the following description, unless otherwise defined, when a member is "fixed to" or "arranged on" another member, the member may be directly on or indirectly on the other member. When the member is "connected" to another member, the member may be directly connected to or indirectly connected to the other member.

The terms "first" and "second" are only used for making the description easy to understand, and they cannot be interpreted to indicate or imply the importance of the configurations or imply the amount of the technical features. Thus, the features being limited by the terms as "first" or "second" may indicate or imply one feature or more features. In the description of the present disclosure, unless otherwise defined, the term "a plurality of" means that an amount is equal to two or more than two. Furthermore, unless otherwise defined, the term "some" means that an amount is equal to one or more than one.

In the description of the present disclosure, it is noted that the orientation or positional relationship indicated by the terms "center", "length", "width", "thickness", "vertical", "horizontal", "top", "bottom", "inside", "outside" and the like are the orientation or the positional relationship based on the enclosed drawings, and such terms are used only for the convenience of describing the present disclosure and simplifying the description. Such terms cannot be interpreted to indicate or imply that the specified device or member has to be configured with the specified orientation or operated with the specified orientation, and such terms cannot be considered to be the limitation to the present disclosure.

In the description of the present disclosure, unless otherwise defined, it is noted that the terms "install", "communicate", and "connect" should be broadly understood. For example, according to such terms, it is possible to perform a fixedly connection, or a detachably connection, or an integrally connection. Also, a mechanical connection may be performed while an electrical connection may be performed. Furthermore, a direct connection, an indirect connection via an intermediate media, or a connection connecting the inside of two elements may be performed. For a person with ordinary skill in the art, the specific meaning of the above-mentioned terms may be suitably understood according to the actual situation.

In the description of the present disclosure, the terms of referring to "an embodiment", "some embodiment", or "embodiments" mean that one embodiment or multiple embodiments of the present disclosure include the specified features, structure, or characteristic described according to the embodiments. Accordingly, unless specifically emphasized otherwise, the terms "in one embodiment", "in some embodiments", "in other embodiments", or the like that appear in various paragraphs in this specification does not necessarily all refer to the same embodiment, however, such terms mean "one or more embodiments but not all of the embodiments". Additionally, in one or more embodiments, the features, structure, and the characteristic may be combined in any appropriate manner.

For the convenience of describing and understanding the present disclosure, the terms used in the present disclosure will be described below. The term "out-of-plane deformation" refers to the deformation occurred when the force-receiving direction is perpendicular to the surface receiving the force, and the stability of the object receiving the force is very low to be close to zero. For a plate member, when the force-receiving direction is perpendicular to the surface where the plate member is in, the stability of the plate member is very low to be close to zero such that it is easy for the out-of-plane deformation to occur. The term "in-plane deformation" refers to the deformation occurred when the force-receiving direction is parallel to the surface receiving the force, and the stability of the object receiving the force is very high to be close to infinite. For the plate member, when the force-receiving direction is parallel to the surface where the plate member is in, the stability of the plate member is very high to be close to infinite such that it is easy for the in-plane deformation to occur.

For the convenience of describing the present disclosure, the direction of the vehicle head is defined as the front side, the direction of the vehicle tail is defined as the rear side. When the user is in the vehicle and facing the front side, the left-hand side is defined as the left side and the right-hand side is defined as the right side; the direction of the top portion of the vehicle is defined as the upper side, and the bottom portion of the vehicle is defined as the lower side. Referring to both FIG. 1 and FIG. 2, the upper side, lower side, front side, rear side, left side, and right side of the whole vehicle body, cross beam, stringer, connection member, and battery pack are defined based on such definitions. Also, the front-rear direction is defined as the longitudinal direction, the left-right direction is defined as the horizontal direction, and the up-down direction is defined as the vertical direction, wherein the longitudinal direction, the horizontal direction, and the vertical direction are perpendicular with each other. The cross section perpendicular to the vertical direction is referred to as the vertical cross section, and the projection that is projected on the plane perpendicular to the vertical direction along the vertical direction is referred to as the vertical projection. The cross section perpendicular to the front-rear direction (longitudinal direction) is referred to as the longitudinal cross section, and the projection that is projected on the plane perpendicular to the longitudinal direction along the longitudinal direction is referred to as the longitudinal projection. The cross section perpendicular to the left-right direction (horizontal direction) is referred to as the horizontal cross section, and the projection that is projected on the plane perpendicular to the horizontal direction along the horizontal direction is referred to as the horizontal projection. Also, it is defined that the direction viewing from the front side toward the rear side is the foresight direction, the direction viewing from the rear side toward the front side is the backsight direction, the direction viewing from the left side toward the right side is the left-view direction, the direction viewing from the right side toward the left side is the right-view direction, the direction viewing from the upper side toward the lower side is the bird's-eye view direction, and the direction viewing from the lower side toward the upper side is the looking-up direction.

Figure 2:
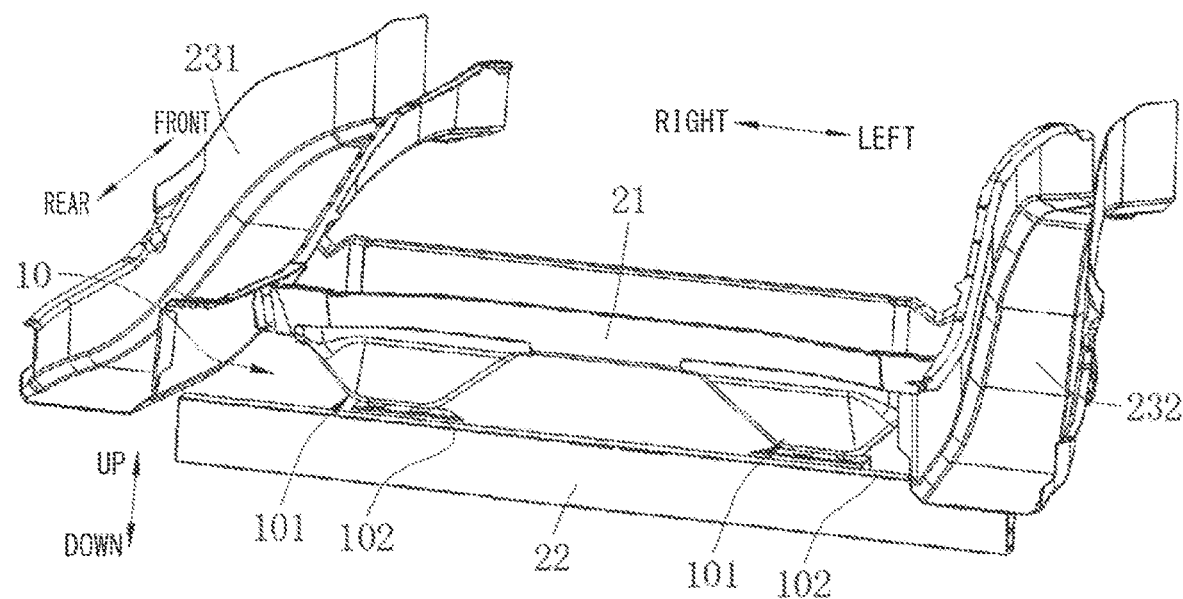
FIG. 2 is a schematic view in a front view direction showing the three-dimensional structure of the connection structure of the battery pack with the vehicle body connecting the battery pack and the crossbeam according to the first embodiment of the present disclosure.
Figure 10:
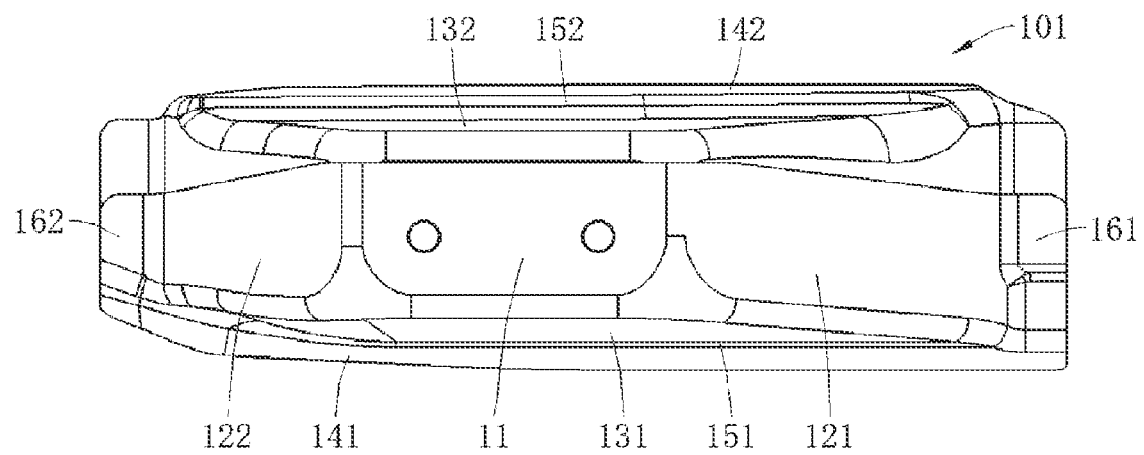
FIG. 10 is a schematic view showing an upward view structure of the first connection member according to the first embodiment of the present disclosure.

Referring to FIG. 1, FIG. 2 and FIG. 10, a connection structure of a battery pack and a vehicle body 10 according to the present disclosure will be described. The connection structure of a battery pack and a vehicle body 10 is configured to connect a battery pack 22 and the vehicle body so as to install the battery pack 22 inside the vehicle body.

The vehicle body includes a left stringer 232, a right stringer 231, and a crossbeam 21. The left stringer 232 and the right stringer 231 are connected to the two ends of the cross beam 21 respectively. During the usage thereof, the rear end of the battery pack 22 is connected with the crossbeam 21 so as to support the rear end of the battery pack 22 via the crossbeam 21. More specifically, the battery pack 22 and the crossbeam 21 of the vehicle body is connected by the connection structure 10 of the battery pack and the vehicle body.

The connection structure of a battery pack and a vehicle body 10 includes a first connection member 101. The first connection member 101 is configured to connect the battery pack 22 and the crossbeam 21. In other words, when being used, the lower end of the first connection member 101 is connected with the battery pack 22, and the upper end of the first connection member 101 is connected with the crossbeam 21 so as to connect the battery pack with the crossbeam 21 That is, the battery pack 22 is connected with the crossbeam 21 via the first connection member 101.

The first connection member 101 includes a first inclination plate 121 and a second inclination plate 122. When being used, the first inclination plate 121 and the second inclination plat 122 are arranged with an interval therebetween along the left-right direction (that is, the horizontal direction), and the first inclination plate 121 is positioned at the side of the second inclination plate 122 close to the right stringer 231. That is, the first inclination plate 121 is positioned at the right side of the second inclination plate 122 and the second inclination plate 122 is positioned at the left side of the first inclination plate 121.

One end of the first inclination plate 121 is connected with the crossbeam 21, and the other end of the first inclination plate 121 is connected with the battery pack 22; also, one end of the second inclination plate 122 is connected with the crossbeam 21, and the other end of the second inclination plate 122 is connected with the battery pack 22 such that the first connection member 101 connects the crossbeam 21 and the battery pack 22 and thus the battery pack 22 is connected with the crossbeam 21 via the first connection member 101.

Figure 13:
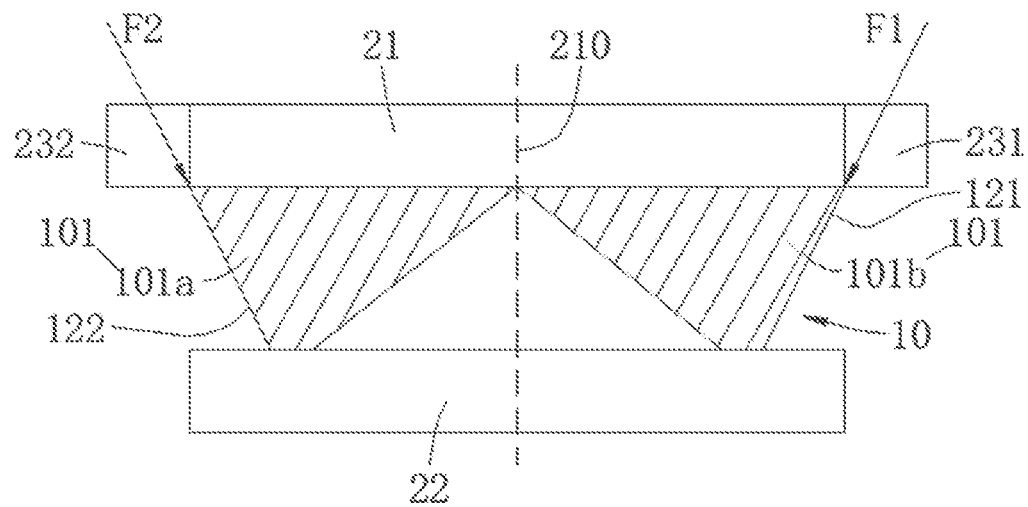
FIG. 13 is a schematic view in a rear view direction showing a normal view structure of a connection structure of a battery pack with a vehicle body connecting the battery pack and a crossbeam according to a fourth embodiment of the present disclosure.

Referring to both FIG. 1 and FIG. 13, the extension surface of the first inclination plate 121 that is the closest to the right stringer 231 intersects the right stringer 231. That is, the plane on which the first inclination plate 121 that is the closest to the right stringer 231 intersects the right stringer 231 so as to make the first inclination plate 121 that is the closest to the right stringer 231 to be approximately on the same plane with the force F1 from the right stringer 231. In other words, the first inclination plate 121 being near to the right stringer 231 is approximately on the same plane with the force F1 from the right stringer 231 so as to make the deformation generated due to the force F1 from the right stringer 231 with respect to the first inclination plate 121 to be the in-plane deformation or approximately the in-plane deformation. Accordingly, it is possible to reduce the out-of-plane deformation of the first inclination plate 121 to ensure the suitable stability of the first inclination plate 121 and connect the battery pack 22 with the crossbeam 21 more stably to ensure the structural strength of the vehicle body. Here, the term "approximately" means that a certain error is allowed to exist and the term "the first inclination plate 121 being near to the right stringer 231 is approximately on the same plane with the force F1 from the right stringer 231" means the force F1 from the right stringer 231 is on the same plane with the first inclination plate 121; however, a certain error such as the processing error, the installation error and the like is allowed. That is, due to the existence of the processing error, the installation error and the like, the force F1 from the right stringer 231 and the first inclination plate 121 are on the same plane during the design step; however, after the actual installation, the first inclination plate 121 being close to the right stringer 231 and the force F1 from the right stringer 231 may not be in the same plane, and sometimes the error may exist. Of course, the more the first inclined plate 121 close to the right stringer 231 and the force F1 from the right stringer 231 tend to be on the same plane, the more the deformation by the force F1 from the right stringer 231 with respect to the first inclination plate 121 tends to be the in-plane deformation such that the stability of the first inclination plate 121 becomes better.

It can be understood that the term of "the extension surface of the inclination plate intersects the stringer" may be the situation in which the inclination plate itself directly connects with the stringer, or the plane in which the inclination plate is positioned intersects the stringer and at this time, the inclination plate itself does not directly connect with the stringer.

Similarly, referring to both FIG. 1 and FIG. 13, the extension surface of the second inclination plate 122 that is the closest to the left stringer 232 intersects the left stringer 232. That is, the plane on which the second inclination plate 122 that is the closest to the left stringer 232 intersects the left stringer 232 so as to make the second inclination plate 122 that is the closest to the left stringer 232 to be approximately on the same plane with the force F2 from the left stringer 232. In other words, the second inclination plate 122 being near to the left stringer 232 is approximately on the same plane with the force F2 from the left stringer 232 so as to make the deformation generated due to the force F2 from the left stringer 232 with respect to the second inclination plate 122 to be the in-plane deformation or approximately the in-plane deformation. Accordingly, it is possible to reduce the out-of-plane deformation of the second inclination plate 122 to ensure the suitable stability of the second inclination plate 122 and connect the battery pack 22 with the crossbeam 21 more stably to ensure the structural strength of the vehicle body. Here, the term "approximately" means that a certain error is allowed to exist and the term "the second inclination plate 122 being near to the left stringer 232 is approximately on the same plane with the force F2 from the left stringer 232" means the force F2 from the left stringer 232 is on the same plane with the second inclination plate 122; however, a certain error such as the processing error, the installation error and the like is allowed. That is, due to the existence of the processing error, the installation error and the like, the force F2 from the left stringer 232 and the second inclination plate 122 are on the same plane during the design step; however, after the actual installation, the second inclination plate 122 being close to the left stringer 232 and the force F2 from the left stringer 231 may not be in the same plane, and sometimes the error may exist. Of course, the more the second inclined plate 122 close to the left stringer 232 and the force F2 from the left stringer 232 tend to be on the same plane, the more the deformation by the force F2 from the left stringer 232 with respect to the second inclination plate 122 tends to be the in-plane deformation such that the stability of the second inclination plate 122 becomes better.

Comparing with the conventional technology, the connection structure of a battery pack and a vehicle body 10 according to the present embodiment is configured to connect the rear end of the battery pack 22 with the crossbeam 21 and further make the force F1 from the right stringer 231 and the first inclination plate 121 at the most right side to be approximately on the same plane so as to reduce the out-of-plane deformation of the first inclination plate 121 and make the force F1 from the right stringer 231 to generate the approximately in-plane deformation with respect to the first inclination plate 121 at the most right side and ensure the suitable stability of the first inclination plate 121. Similarly, the force F2 from the left stringer 232 and the second inclination plate 122 at the most left side are approximately on the same plane so as to reduce the out-of-plane deformation of the second inclination plate 122 and make the force F2 from the left stringer 232 to generate the approximately in-plane deformation with respect to the second inclination plate 122 at the most left side and ensure the suitable stability of the second inclination plate 122, and thus to ensure the stability of the connection between the battery pack 22 and the vehicle body.

Figure 3:
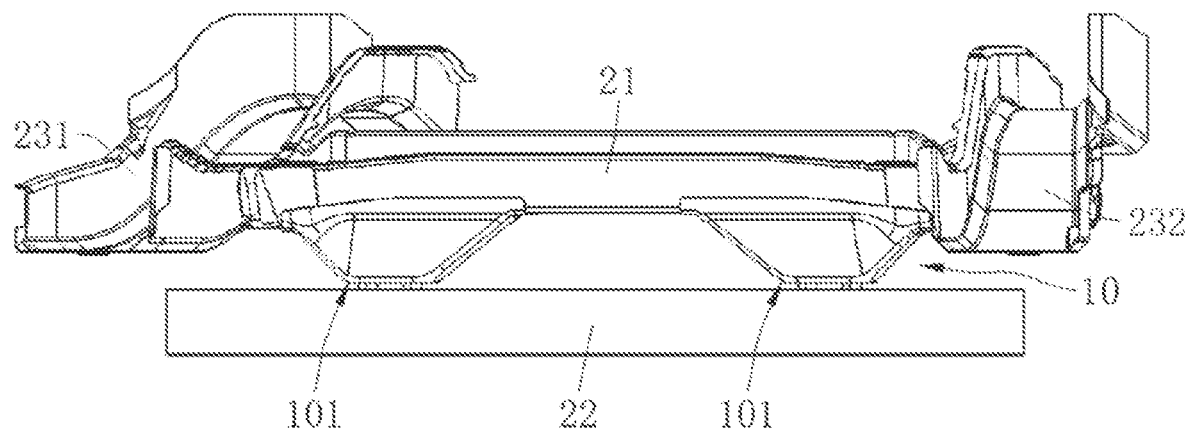
FIG. 3 is a schematic view in the front view direction showing a normal view structure of the connection structure of the battery pack with the vehicle body connecting the battery pack and the crossbeam according to the first embodiment of the present disclosure.

According to an example referring from FIG. 1 to FIG. 3, the right stringer 231 is connected to the right end of the crossbeam 21 via a right support member 211. That is, the right support member 211 is installed on the right end of the crossbeam 21 and the right support member 211 is connected to the right stringer 231 so as to connect the right stringer 231 to the right end of the crossbeam 21. The first inclination plate 121 being the closest to the right stringer 231 intersects the right support member 211, and the plane on which the first inclination plate 121 being the closest to the right stringer 231 intersects the right stringer 231.

Figure 12:
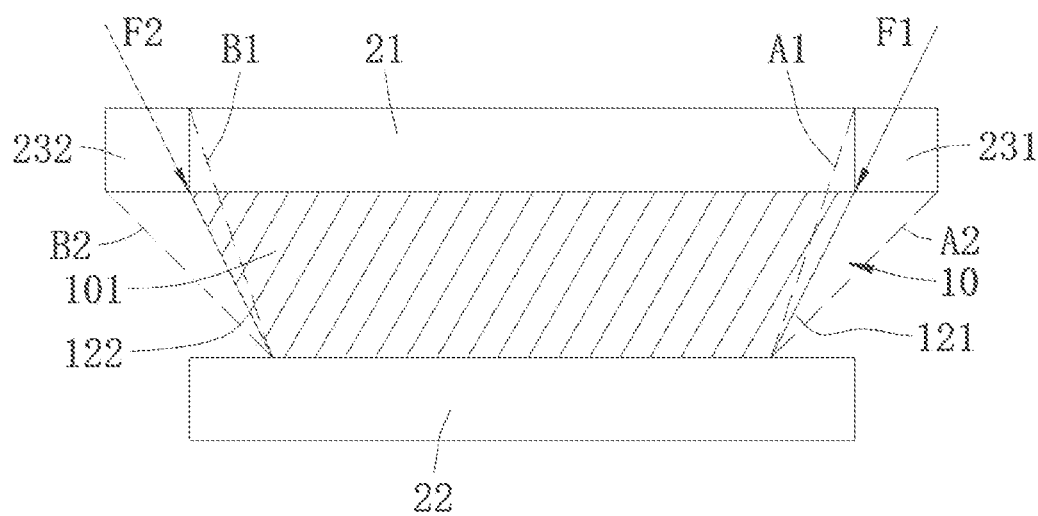
FIG. 12 is a schematic view in a rear view direction showing a normal view structure of a connection structure of a battery pack with a vehicle body connecting the battery pack and a crossbeam according to a third embodiment of the present disclosure.

It can be understood that as referring to FIG. 12, the first inclination plate 121 being the closest to the right stringer 231 may be directly connected with the right stringer 231.

Of course, the first inclination plate 121 being the closest to the right stringer 231 may be separated from the right stringer 231, and only the extension surface of the first inclination plate 121 being the closest to the right stringer 231 intersects the right stringer 231. That is, when the connection position of the first inclination plate 121 being the closest to the right stringer 231 and the battery pack 22 is determined, the first inclination plate 121 being the closest to the right stringer 231 is positioned between the dotted line A1 and the dotted line A2 in FIG. 12, and the extension surface of the first inclination plate 121 being the closest to the right stringer 231 intersects the right stringer 231.

According to an example referring from FIG. 1 to FIG. 3, the left stringer 232 is connected to the left end of the crossbeam 21 via a left support member 212. That is, the left support member 212 is installed on the left end of the crossbeam 21 and the left support member 211 is connected to the left stringer 232 so as to connect the left stringer 232 to the left end of the crossbeam 21. The second inclination plate 122 being the closest to the left stringer 232 intersects the left support member 212, and the plane on which the second inclination plate 122 being the closest to the left stringer 232 intersects the left stringer 232.

It can be understood that as referring to FIG. 12, the second inclination plate 122 being the closest to the left stringer 232 may be directly connected with the left stringer 232.

Of course, the second inclination plate 122 being the closest to the left stringer 232 may be separated from the left stringer 232, and only the extension surface of the second inclination plate 122 being the closest to the left stringer 232 intersects the left stringer 232. That is, when the connection position of the second inclination plate 122 being the closest to the left stringer 232 and the battery pack 22 is determined, the second inclination plate 122 being the closest to the left stringer 232 is positioned between the dotted line B1 and the dotted line B2 in FIG. 12, and the extension surface of the second inclination plate 122 being the closest to the left stringer 232 intersects the left stringer 232.

According to an example referring from FIG. 1 to FIG. 3, a longitudinal cross section of the first connection member 101 is an approximately triangular shape. That is, when viewed in the longitudinal direction, the first connection member 101 is formed in an approximately triangular shape. In a direction from the crossbeam 21 to the battery pack 22, the length of the first connection member 101 along the left-right direction is set to be gradually decreased. In other words, the length of the end of the first connection member 101 being close to the crossbeam 21 is relatively large and the end of the first connection member 101 being close to the crossbeam 21 is a wide end. The length of the end of the first connection member 101 being close to the battery pack 22 is relatively small and the end of the first connection member 101 being close to the battery pack 22 is a narrow end. Accordingly, the narrow end of the first connection member 101 is connected with the battery pack 22 and the wide end of the first connection member 101 is connected with the crossbeam 21 to increase the contact area with the crossbeam 21, increase the area of the crossbeam 21 for receiving the force, and improve the structural strength thereof. Also, the first connection member 101 is formed to have the approximately triangular shape to be difficult to deform and the structure is more stable so as to improve the structural stability and structural strength of the first connection member 101 and thus stably support the battery pack 22 on the crossbeam 21. Here, the term "approximately triangular shape" means that the shape of the first connection member 101 is approximately formed in the triangular shape rather than the standard triangular shape, and a vertex portion in the height direction of the approximately triangular shape (equivalent to the vertex angle of the standard triangle) is allowed to have a certain width. By forming the first connection member 101 in the approximately triangular shape, it is convenient for the narrow end of the first connection member 101 to be connected to the battery pack 22. It is understood that the certain width is provided in the vertex portion of the approximately triangular shape in the height direction for reserving a connection point with the battery pack in the vertex portion. In order to make the structure of the first connection member 101 to tend to the standard triangular shape, it is possible to make a ratio of the vertical cross section at the vertex portion (that is, the narrow end) to the vertical cross section at the bottom portion (that is, the wide end) to be as small as possible in the height direction of the first connection member 101.

In an example referring from FIG. 1 to FIG. 3, the number of the first connection members 101 is two, and ends of the two first connection members 101 being close to the crossbeam 21 are arranged with an interval therebetween. It is possible to reduce the dimension and weight of each first connection member 101 by forming the two first connection members so as to facilitate the processing and manufacturing and reduce the weight of the vehicle body. The ends of the two adjacent first connection members 101 being close to the crossbeam 21 are arranged with the interval therebetween so as to make the two first connection members 101 to further approach the left ends and the right ends of the crossbeam 21 and the battery pack 22 to connect the left end and the right end of the battery pack 22 with the left end and the right end of the crossbeam 21 respectively, and thus make the battery pack 21 and the crossbeam 22 to receive the force more uniformly to support the battery pack 22 on the crossbeam 21 more stably.

Figure 7:
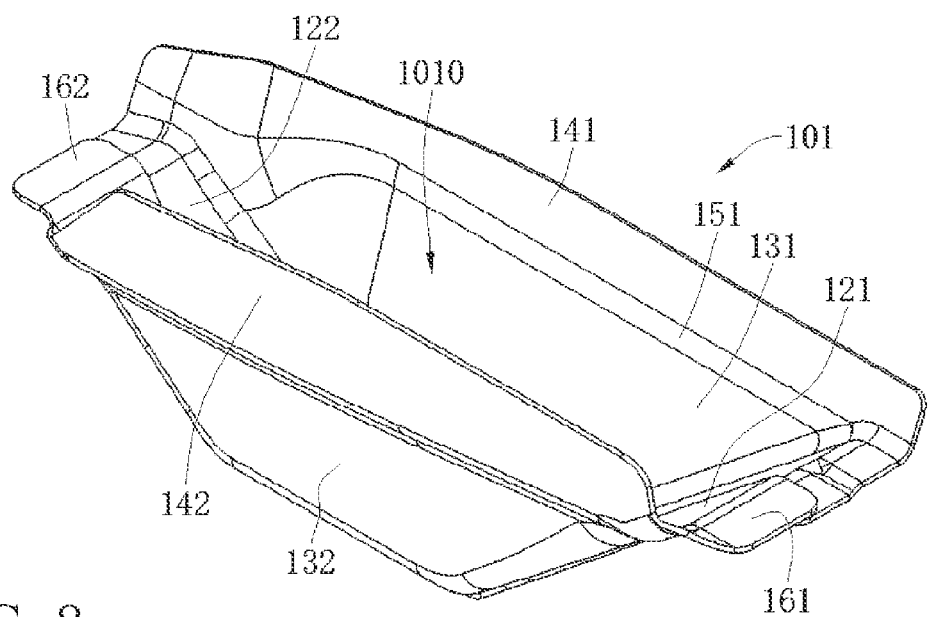
FIG. 7 is a first schematic view showing a three-dimensional structure of the first connection member according to the first embodiment of the present disclosure.
Figure 9:
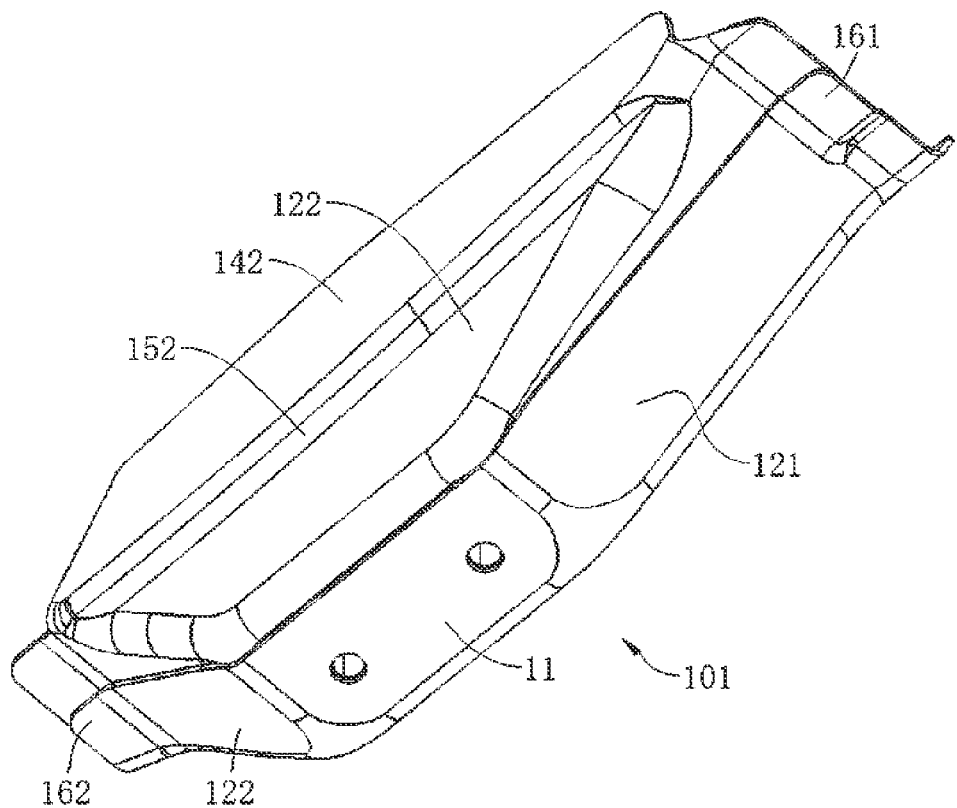
FIG. 9 is a third schematic view showing the three-dimensional structure of the first connection member according to the first embodiment of the present disclosure.

According to an example referring to FIG. 1, FIG. 7, and FIG. 9, the first connection member 101 includes a first bottom sticking plate 161, wherein the first bottom sticking plate 161 is provided to extend from the end of the first inclination plate 121 being close to the crossbeam 21 in the direction separating from the second inclination plate 122. In other words, the first sticking plate 161 is provided to extend from the upper end of the first inclination plate 121 in the direction separating from the second inclination plate 122. When being used, the first bottom sticking plate 161 is stuck and fixed to the bottom surface of the crossbeam 21, that is, the first sticking plate 161 is used for being stuck and fixed to the bottom surface of the crossbeam 21. Accordingly, it is possible to increase the contact area of the first connection member 101 and the crossbeam 21 so as to increase the area of the crossbeam 21 for receiving the force, disperse the force receiving points, reduce the stress concentration, and improve the structural stability.

In an example according to FIG. 1, FIG. 7, and FIG. 9, the first connection member 101 includes a second bottom sticking plate 162, wherein the second bottom sticking plate 162 is provided to extend from the end of the second inclination plate 122 being close to the crossbeam 21 in the direction separating from the first inclination plate 121. In other words, the second sticking plate 162 is provided to extend from the upper end of the second inclination plate 122 in the direction separating from the first inclination plate 121. When being used, the second bottom sticking plate 162 is stuck and fixed to the bottom surface of the crossbeam 21, that is, the second sticking plate 162 is used for being stuck and fixed to the bottom surface of the crossbeam 21. Accordingly, it is possible to increase the contact area of the first connection member 101 and the crossbeam 21 so as to increase the area of the crossbeam 21 for receiving the force, disperse the force receiving points, reduce the stress concentration, and improve the structural stability.

According to an example, the first bottom sticking plate 161 is formed by extending the corresponding first inclination plate 121, that is, the first bottom sticking plate 161 is integrally molded with the corresponding first inclination plate 121. Optionally, the first bottom sticking plate 161 and the corresponding first inclination plate 121 may be individually molded and then connected with each other by welding.

According to an example, the second bottom sticking plate 162 is formed by extending the corresponding second inclination plate 122, that is, the second bottom sticking plate 162 is integrally molded with the corresponding second inclination plate 122. Optionally, the second bottom sticking plate 162 and the corresponding second inclination plate 122 may be individually molded and then connected with each other by welding.

Figure 8:
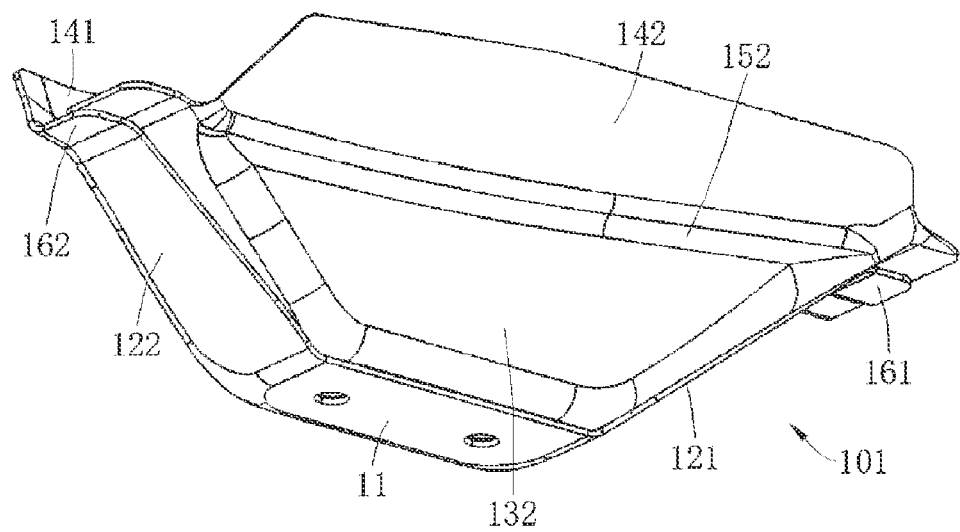
FIG. 8 is a second schematic view showing the three-dimensional structure of the first connection member according to the first embodiment of the present disclosure.

According to an example referring from FIG. 7 to FIG. 9, the first connection member 101 includes both the first bottom sticking plate 161 and the second bottom sticking plate 162 so as to increase the contact area of the first connection member 101 and the crossbeam 21, thus further increase the area of the crossbeam 21 for receiving the force, disperse the force receiving points, reduce the stress concentration, and improve the structural stability.

It can be understood that the first connection member 101 may include the first bottom sticking plate 161 only to simplify the structure. Also, the first connection member 101 may include the second bottom sticking plate 162 only to simplify the structure.

Figure 6:
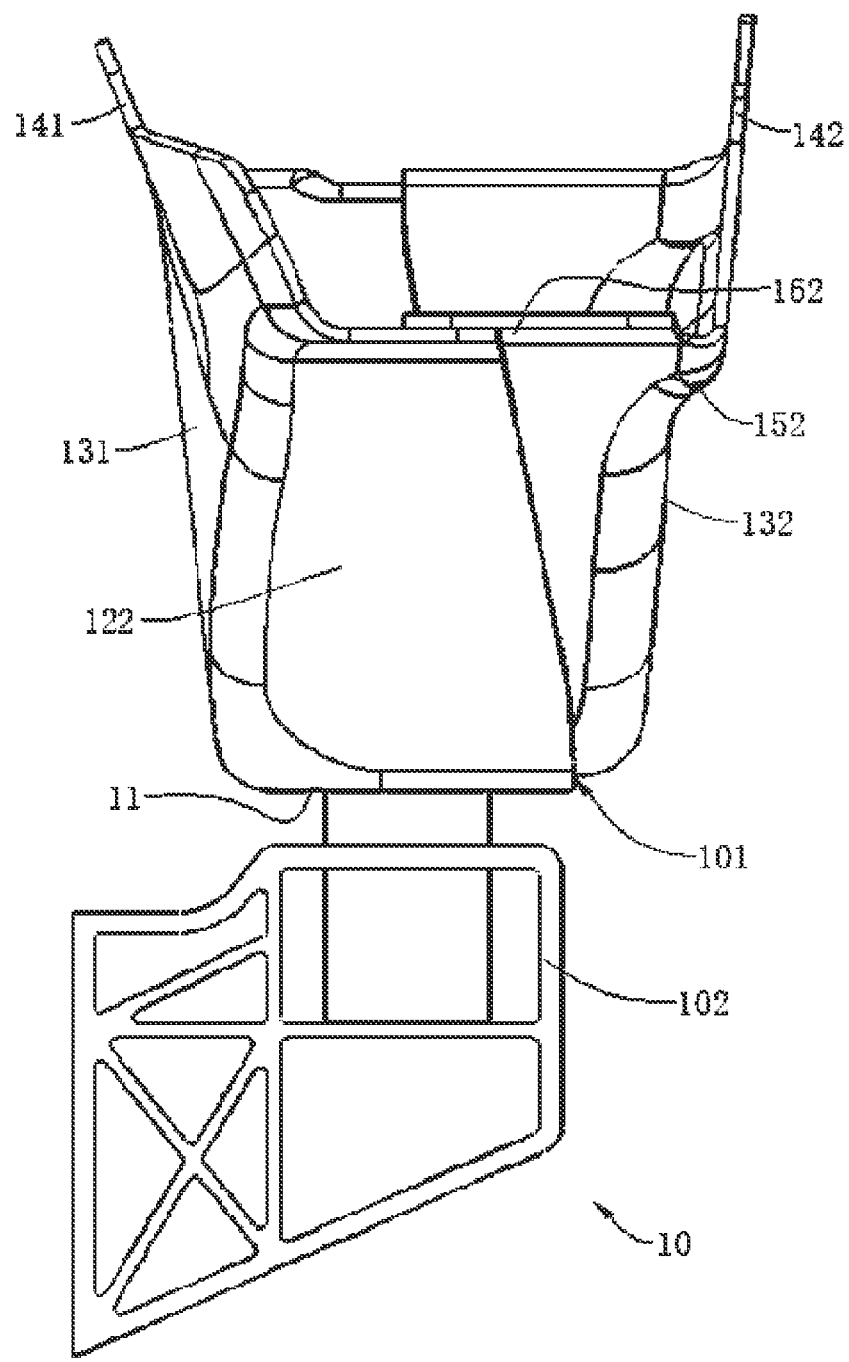
FIG. 6 is a schematic view showing a side view structure of the combination of the first connection member and the second connection member according to the first embodiment of the present disclosure.

According to an example referring to FIG. 3, FIG. 6, and FIG. 10, the first connection member 101 further includes a first vertical plate 131, wherein the right side of the first vertical plate 131 is connected to the front side of the first inclination plate 121, and the left side of the first vertical plate 131 is connected to the front side of the second inclination plate 122. Accordingly, the first vertical plate 131 is positioned on the front side of the first connection member 101. By providing the first vertical plate 131 and connecting the left side and the right side of the first vertical plate 131 to the front side of the second inclination plate 122 and the front side of the first inclination plate 121 respectively, it is possible to increase the structural strength of the first connection member 101 and improve the stability of the first connection member 101 to connect the battery pack 22 and the crossbeam 21 more stably so as to increase the structural strength of the vehicle body.

According to an example referring to FIG. 2, FIG. 7, and FIG. 10, the first connection member 101 includes a first sticking plate 141. When being used, the first sticking plate 141 is used for being stuck and fixed to the front surface of the crossbeam 21, it is not only possible to facilitate the connection and fixation of the first connection member 101 with the crossbeam 21, but also make the force by the front surface of the crossbeam 21 with respect to the first connection member 101 to be mainly applied to the first sticking plate 141 to generate the approximately in-plane deformation with respect to the first sticking plate 141. It is possible to ensure the suitable stability of the first sticking plate 141 and then ensure the stability of the first connection member 101.

According to an example, the first vertical plate 131 and the first sticking plate 141 are arranged to be adjacent to each other so as to increase the structural strength of the first connection member 101 and improve the stability of the first connection member 101.

According to an example referring to FIG. 1, FIG. 2, and FIG. 6, a first bending portion 151 is provided at the lower side of the first sticking plate 141, and the first bending portion 151 is used for being stuck and fixed to the crossbeam 21. When the first connection member 101 is connected to the crossbeam 21, the first bending portion 151 is bent to transition from the bottom surface of the crossbeam 21 to the front surface of the crossbeam 21 such that the first bending portion 151 is stuck and fixed to the corresponding areas of the bottom surface of the crossbeam 21 and the front surface of the crossbeam 21 to increase the contact area of the first connection member 101 and the crossbeam 21 so as to increase the area of the crossbeam 21 for receiving the force, disperse the force receiving points, reduce the stress concentration, and improve the structural stability.

According to an example, the first vertical plate 131 is connected to the first bending portion 151. In other words, the first vertical plate 131 is transitioned to the first sticking plate 141 via the first bending portion 151 so as to ensure the front side of the first connection member 101 to have the suitable structural strength.

According to an example referring to FIG. 3, FIG. 6, and FIG. 10, the first connection member 101 further includes a second vertical plate 132, wherein the right side of the second vertical plate 132 is connected to the rear side of the first inclination plate 121, and the left side of the second vertical plate 132 is connected to the rear side of the second inclination plate 122. Accordingly, the second vertical plate 132 is positioned on the rear side of the first connection member 101. By providing the second vertical plate 132 and connecting the left side and the right side of the second vertical plate 132 to the rear side of the second inclination plate 122 and the rear side of the first inclination plate 121 respectively, it is possible to increase the structural strength of the first connection member 101 and improve the stability of the first connection member 101 to connect the battery pack 22 and the crossbeam 21 more stably so as to increase the structural strength of the vehicle body.

According to an example referring to FIG. 1, FIG. 7, and FIG. 8, the first connection member 101 includes a second sticking plate 142. When being used, the second sticking plate 142 is used for being stuck and fixed to the rear surface of the crossbeam 21, it is not only possible to facilitate the connection and fixation of the first connection member 101 with the crossbeam 21, but also make the force by the rear surface of the crossbeam 21 with respect to the first connection member 101 to be mainly applied to the second sticking plate 142 to generate the approximately in-plane deformation with respect to the second sticking plate 142. It is possible to ensure the suitable stability of the second sticking plate 142 and then ensure the stability of the first connection member 101.

According to an example, the second vertical plate 132 and the second sticking plate 142 are arranged to be adjacent to each other so as to increase the structural strength of the first connection member 101 and improve the stability of the first connection member 101.

According to an example referring to FIG. 1, FIG. 2, and FIG. 6, a second bending portion 152 is provided at the lower side of the second sticking plate 142, and the second bending portion 152 is used for being stuck and fixed to the crossbeam 21. When the first connection member 101 is connected to the crossbeam 21, the second bending portion 152 is bent to transition from the bottom surface of the crossbeam 21 to the rear surface of the crossbeam 21 such that the second bending portion 152 is stuck and fixed to the corresponding areas of the bottom surface of the crossbeam 21 and the rear surface of the crossbeam 21 to increase the contact area of the first connection member 101 and the crossbeam 21 so as to increase the area of the crossbeam 21 for receiving the force, disperse the force receiving points, reduce the stress concentration, and improve the structural stability.

According to an example, the second vertical plate 132 is connected to the second bending portion 152. In other words, the second vertical plate 132 is transitioned to the second sticking plate 142 via the second bending portion 152 so as to ensure the rear side of the first connection member 101 to have the suitable structural strength.

According to an example, the first sticking plate 141 is formed by extending the corresponding first vertical plate 131, that is, the first sticking plate 141 and the corresponding first vertical plate 131 are integrally molded. Optionally, the first sticking plate 141 and the corresponding first vertical plate 131 may be individually molded and then connected with each other by welding. According to an example, the second sticking plate 142 is formed by extending the corresponding second vertical plate 132, that is, the second sticking plate 142 and the corresponding second vertical plate 132 are integrally molded. Optionally, the second sticking plate 142 and the corresponding second vertical plate 132 may be individually molded and then connected with each other by welding.

According to an example, the first connection member 101 includes the first sticking plate 141 and the second sticking plate 142 so as to further ensure the stability of the first connection member 101 when being used. It can be understood that the first connection member 101 may include the first sticking plate 141 only. Also, the first connection member 101 may include the second sticking plate 142 only.

It can be understood that the first connection member 101 includes the connection structure, wherein the first inclination plate 121 and the second inclination plate 122 are connected to the two ends of the connection structure in the horizontal direction, while the first sticking plate 141 is connected to the connection structure and the second sticking plate 142 is connected to the connection structure such that the first vertical plate 131 and the second vertical plate 132 may not be provided therein. The connection structure may be the sectional material, the grating member, the panel member or the like.

According to an example, the two ends of the first sticking plate 141 are connected to the first bottom sticking plate 161 and the second bottom sticking plate 162 respectively to increase the structural strength of the first connection member 101. Similarly, the two ends of the second sticking plate 142 are connected to the first bottom sticking plate 161 and the second bottom sticking plate 162 respectively to increase the structural strength of the first connection member 101.

According to an example referring to FIG. 1, FIG. 2, and FIG. 10, the first bending portion 151 is provided at the lower side of the first sticking plate 141 and the second bending portion 152 is provided at the lower side of the second sticking plate 142 so as to further increase the contact area of the first connection member 101 and the crossbeam 21, increase of the area of the crossbeam 21 for receiving the force, disperse the force receiving points, reduce the stress concentration, and improve the structural stability. It can be understood that only the first bending portion 151 is provided at the lower side of the first sticking plate 141. Also, it is possible that only the second bending portion 152 is provided at the lower side of the second sticking plate 142.

According to an example, the first vertical plate 131 is adjacent to the lower side of the first sticking plate 141, and the first vertical plate 131 and the first sticking plate 141 are on the same plane. In other words, the first vertical plate 131 and the first sticking plate 141 are formed as one plate. By arranging the first vertical plate 131 and the first sticking plate 141 on the same plane, it is not only convenient to perform the processing and manufacturing, but also when the force from the crossbeam 21 with respect to the first connection member 101 is transmitted to the first vertical plate 131 via the first sticking plate 141 (that is, the force by the crossbeam 21 with respect to the first vertical plate 131), the force is approximately on the same plane with the first vertical plate 131 such that the approximately in-plane deformation is generated with respect to the first vertical plate 131. Accordingly, it is possible to ensure the suitable stability of the first vertical plate 131 and thus ensure the stability of the first connection member 101. Here, the term "approximately" means that the certain error is allowed, that is, due to the errors such as the manufacturing error, the installation error and the like, the force by the crossbeam 21 with respect to the first vertical plate 131 and the first vertical plate 131 are on the same plane during the design stage; however, after the actual installation, the first vertical plate 131 and the force by the crossbeam 21 with respect to the first vertical plate 131 may not be on the same plane, and there is sometimes the certain errors occurred. It is understood that when the first vertical plate 131 and the force by the crossbeam 21 with respect to the first vertical plate 131 tend to be on the same plane, the deformation generated due to the force by the crossbeam 21 with respect to the first vertical plate 131 tends to be the in-plane deformation such that the stability of the first vertical plate 131 becomes better and correspondingly the stability of the first connection member 101 becomes better.

According to an example, the second vertical plate 132 is adjacent to the lower side of the second sticking plate 142, and the second vertical plate 132 and the second sticking plate 142 are on the same plane. In other words, the second vertical plate 132 and the second sticking plate 142 are formed as one plate. By arranging the second vertical plate 132 and the second sticking plate 142 on the same plane, it is not only convenient to perform the processing and manufacturing, but also when the force from the crossbeam 21 with respect to the first connection member 101 is transmitted to the second vertical plate 132 via the second sticking plate 142 (that is, the force by the crossbeam 21 with respect to the second vertical plate 132), the force is approximately on the same plane with the second vertical plate 132 such that the approximately in-plane deformation is generated with respect to the second vertical plate 132. Accordingly, it is possible to ensure the suitable stability of the second vertical plate 132 and thus ensure the stability of the first connection member 101. Here, the term "approximately" means that the certain error is allowed, that is, due to the errors such as the manufacturing error, the installation error and the like, the force by the crossbeam 21 with respect to the second vertical plate 132 and the second vertical plate 132 are on the same plane during the design stage; however, after the actual installation, the second vertical plate 132 and the force by the crossbeam 21 with respect to the second vertical plate 132 may not be on the same plane, and there is sometimes the certain errors occurred. It is understood that when the second vertical plate 132 and the force by the crossbeam 21 with respect to the second vertical plate 132 tend to be on the same plane, the deformation generated due to the force by the crossbeam 21 with respect to the second vertical plate 132 tends to be the in-plane deformation such that the stability of the second vertical plate 132 becomes better and correspondingly the stability of the first connection member 101 becomes better.

It is understood that the solution in which the vertical plate and the corresponding sticking plate are on the same plane and the solution in which the sticking plate includes the bending portion may be individually configured or be configured in combination. In order to assist the understanding, a combination example will be described herewith that the first vertical plate 131 communicates with the lower side of the first sticking plate 141 and the first vertical plate 131 and the first sticking plate 141 are on the same plane, while the second vertical plate 132 transitions to the second sticking plate 142 via the second bending portion 152. Of course, the second vertical plate 132 communicates with the lower side of the second sticking plate 142 and the second vertical plate 132 and the second sticking plate 142 are on the same plane, while the first vertical plate 131 transitions to the first sticking plate 141 via the first bending portion 151.

According to an example referring to FIG. 2, FIG. 6, and FIG. 7, the first connection member 101 further includes a hollow structure 1010, wherein an end of the hollow structure 1010 that is close to the crossbeam 21 is formed in an open shape. By providing the hollow structure 1010, it is possible to reduce the weight of the first connection member 101 so as to reduce the weight of the vehicle body, and forming the end of the hollow structure 1010 being close to the crossbeam 21 in the open shape may facilitate the processing and manufacturing.

According to an example referring to FIG. 8, FIG. 9 and FIG. 10, the first connection member further includes a bottom plate, wherein the first inclination plate 121 and the second inclination plate 122 are connected with the two ends of the bottom plate 11 in the horizontal direction, that is, the first inclination plate 121 is connected with the right end of the bottom plate 11, and the second inclination plate 122 is connected with the left end of the bottom plate 11. By connecting the first inclination plate 121 and the second inclination plate 122 with the bottom plate 11, it is possible to improve the structural strength of the first connection member 101.

According to an example, when the first connection member 101 includes the first vertical plate 131 and the second vertical plate 132, the first vertical plate 131 is connected with the front edge of the bottom plate 11, and the second vertical plate 132 is connected with the rear edge of the bottom plate 11 so as to improve the structural strength of the first connection member 101.

According to an example, the first connection member 101 may be formed by the sheet metal stamping to facilitate the processing and the manufacturing while ensuring the structural strength of the first connection member 101. Of course, the first connection member 101 may also be formed by the forging processing or the casting processing to facilitate the processing and the manufacturing.

According to an example, the hollow structure 1010 is formed by being encircled by the bottom plate 11, the first inclination plate 121, the second inclination plate 122, the first vertical plate 131, and the second vertical plate 132.

Figure 4:
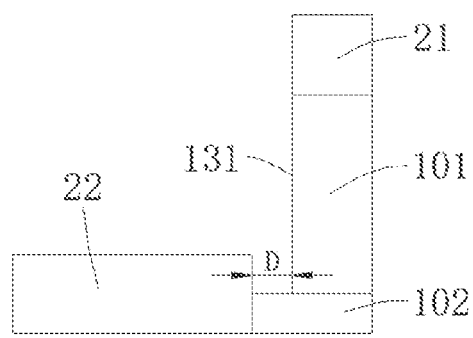
FIG. 4 is a schematic view in a left view direction showing the normal view structure of the connection structure of the battery pack with the vehicle body connecting the battery pack and the crossbeam according to the first embodiment of the present disclosure.
Figure 5:
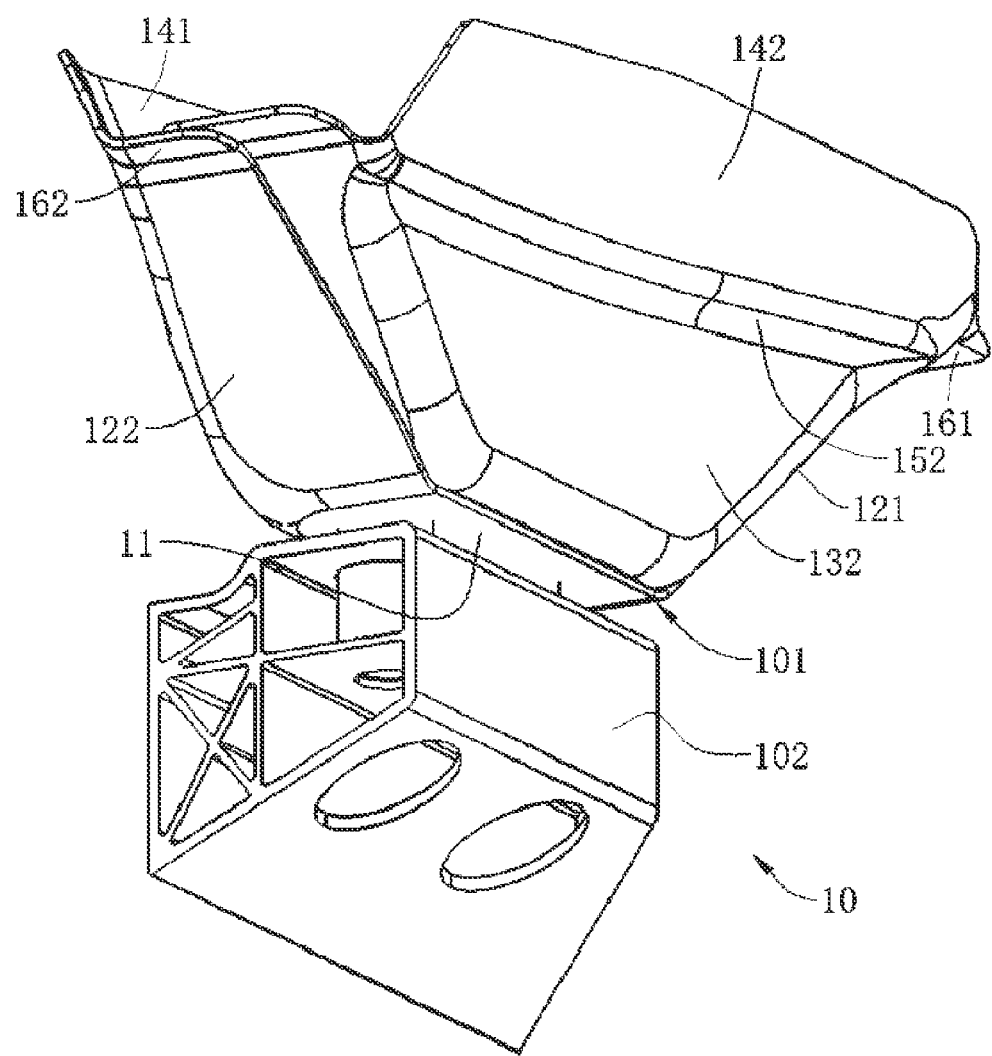
FIG. 5 is a schematic view showing a three-dimensional structure of a combination of a first connection member and a second connection member according to the first embodiment of the present disclosure.

According to an example referring to FIG. 1, FIG. 4, and FIG. 5, when the distance D between the first vertical plate 131 of the first connection member 101 and the rear surface of the battery pack 22 is larger than the predetermined distance, the connection structure of a battery pack and a vehicle body 10 further includes the second connection member 102, wherein the lower end of the first vertical plate 131 is connected with the second connection member 102, and the second connection member 102 is connected with the rear surface of the battery pack 22.

When the first vertical plate 131 is connected with the rear surface of the battery pack 22 by the welding, the predetermined distance is the maximum possible distance between the first vertical plate 131 and the rear surface of the battery pack 22 while ensuring the connection strength between the first vertical plate 131 and the battery pack 22. With respect to the different types of the vehicle bodies and battery packs 22, the predetermined distance varies that the predetermined distance is specifically determined by the welding strength requirement, the structure of the crossbeam 21, the battery pack 22 and the first connection member 101, and the installation requirement. When the distance D between the first vertical plate 131 and the rear surface of the battery pack 22 is larger than the predetermined distance, it is clear that the distance D between the first vertical plate 131 and the rear surface of the battery pack 22 is excessively large such that the welding strength cannot be reached when the first vertical plate 131 is connected to the rear surface of the battery pack 22 by the welding. At this time, by providing the second connection member 102 and connecting the first connection member 101 and the battery pack 22 via the second connection member 102, it is possible to ensure the structural strength of the connection and improve the compatibility of the connection structure 10 with respect to the battery packs 22 and vehicle bodies with different sizes.

When the first vertical plate 131 is connected with the rear surface of the battery pack 22 by the bolts, the predetermined distance is the maximum possible distance between the first vertical plate 131 and the rear surface of the battery pack 22 while ensuring the connection strength between the first vertical plate 131 and the battery pack 22. With respect to the different types of the vehicle bodies and battery packs 22, the predetermined distance varies that the predetermined distance is specifically determined by the connection strength requirement of the bolts, the structure of the crossbeam 21, the battery pack 22 and the first connection member 101, and the installation requirement. When the distance D between the first vertical plate 131 and the rear surface of the battery pack 22 is larger than the predetermined distance, it is clear that the distance D between the first vertical plate 131 and the rear surface of the battery pack 22 is excessively large such that the connection strength by the bolts cannot be reached when the first vertical plate 131 is connected to the rear surface of the battery pack 22 by the bolts. At this time, by providing the second connection member 102 and connecting the first connection member 101 and the battery pack 22 via the second connection member 102, it is possible to ensure the structural strength of the connection and improve the compatibility of the connection structure 10 with respect to the battery packs 22 and vehicle bodies with different sizes.

Figure 11:
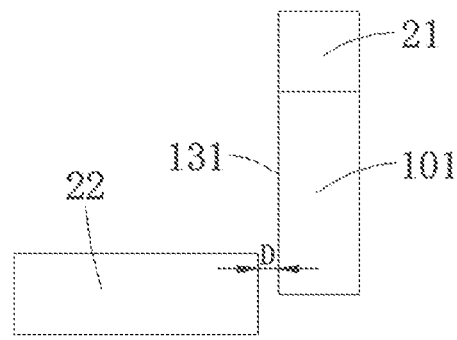
FIG. 11 is a schematic view in a left view direction showing a normal view structure of a connection structure of a battery pack with a vehicle body connecting the battery pack and a crossbeam according to a second embodiment of the present disclosure.

According to an example referring to FIG. 11, when the distance D between the first vertical plate 131 of the first connection member 101 and the rear surface of the battery pack 22 is equal to or less than the predetermined distance, the lower end of the first vertical plate 131 is connected with the rear surface of the battery pack 22 so as to simplify the structure, facilitate the installation, reduce the cost, and improve the structural strength of the vehicle body. When the first vertical plate 131 is connected with the rear surface of the battery pack 22 by the welding, the predetermined distance is the maximum possible distance between the first vertical plate 131 and the rear surface of the battery pack 22 while ensuring the connection strength between the first vertical plate 131 and the battery pack 22. With respect to the different types of the vehicle bodies and battery packs 22, the predetermined distance varies that the predetermined distance is specifically determined by the welding strength requirement, the structure of the crossbeam 21, the battery pack 22 and the first connection member 101, and the installation requirement. When the first vertical plate 131 is connected with the rear surface of the battery pack 22 by the bolts, the predetermined distance is the maximum possible distance between the first vertical plate 131 and the rear surface of the battery pack 22 while ensuring the connection strength between the first vertical plate 131 and the battery pack 22. With respect to the different types of the vehicle bodies and battery packs 22, the predetermined distance varies that the predetermined distance is specifically determined by the connection strength requirement of the bolts, the structure of the crossbeam 21, the battery pack 22 and the first connection member 101, and the installation requirement.

According to an example referring to FIG. 5, FIG. 6, and FIG. 8, when the connection structure of a battery pack and a vehicle body 10 further includes the second connection member 102 and the first connection member 101 includes the bottom plate 11, the bottom plate 11 is connected with the second connection member 102 so as to facilitate the connection while ensuring the firmness of the connection.

According to an example referring to FIG. 3, the number of the first connection members is two, and the two of the first connection members 101 are arranged with an interval therebetween so as to make each first connection member 101 to have a smaller size and reduce the dimension and weight of each first connection member 101. On the other hand, it is possible to form an installation space in the gap between the two first connection members 101 by arranging the two first connection members with the interval therebetween, and the gap between the two first connection members forms the approximately triangular shape so as to improve the structural strength and ensure the stability. Here, the term "approximately triangular shape" means that the shape is approximately formed as the triangular shape rather than the standard triangle and it is allowed that the vertex portion in the height direction of the triangle has the certain width.

According to an example referring to FIG. 12, the number of the first connection member 101 may be set to one so as to make the crossbeam 21 and the first connection member 101 to have a relatively large contact area and improve the structural strength. As in the present example, the connection structure of a battery pack and a vehicle body 10 includes the first connection member 101a and the first connection member 101b, and the first connection member 101a and the first connection member 101b are arranged with the interval therebetween such that it is possible to manufacture the first connection member 101a and the first connection member 101b with a smaller size and reduce the dimension and the weight of the first connection member 101a and the first connection member 101b. On the other hand, by arranging the first connection member 101a and the first connection member 101b with the interval therebetween so as to form the installation space in the gap between the first connection member 101a and the first connection member 101b. Also, the gap between the first connection member 101a and the first connection member 101b is formed in the approximately triangular shape so as to improve the structural strength and ensure the stability. Here, the term "approximately triangular shape" means that the shape is approximately formed as the triangular shape rather than the standard triangle and it is allowed that the vertex portion in the height direction of the triangle has the certain width.

According to an example referring to FIG. 13, the number of the first connection members may be set to two, and the ends of the two first connection members 101 being close to the crossbeam 21 are adjacent to each other. The connection structure of a battery pack and a vehicle body includes the first connection member 101a and the first connection member 101b, and the end of the first connection member 101a being close to the crossbeam 21 and the end of the first connection member 101b being close to the crossbeam 21 are adjacent to each other. According to such a configuration, the gap between the first connection member 101a and the first connection member 101b is formed in the approximately triangular shape. Here, the term "approximately triangular shape" means that during the actual installation, in order to ensure the connection of each first connection member 101 with the crossbeam 21, there is the certain gap between the two first connection members 101 such that the shape formed in the gap between the first connection member 101a and the first connection member 101b is the approximately triangular shape rather than the standard triangular shape and it is allowed that the vertex portion in the height direction of the triangle has the certain width.

Figure 14:
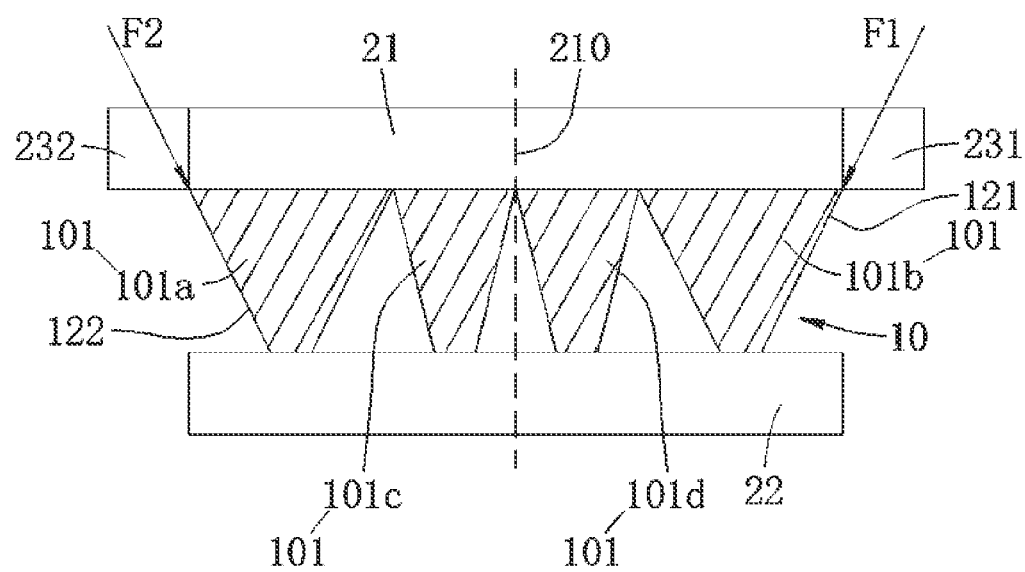
FIG. 14 is a schematic view in a rear view direction showing a normal view structure of a connection structure of a battery pack with a vehicle body connecting the battery pack and a crossbeam according to a fifth embodiment of the present disclosure.

According to an example referring to FIG. 14, the number of the first connection members may be set to four, and the ends of the adjacent two of the first connection members being close to the crossbeam 21 are adjacent to each other. The connection structure of a battery pack and a vehicle body 10 includes the first connection member 101a, the first connection member 101b, the first connection member 101c, and the first connection member 101d. The first connection member 101a, the first connection member 101b, the first connection member 101c, and the first connection member 101d are arranged in sequence along the longitudinal direction. The end of the first connection member 101a being close to the crossbeam 21 and the end of the first connection member 101c being close to the crossbeam 21 are adjacent to each other, the end of the first connection member 101c being close to the crossbeam 21 and the end of the first connection member 101d being close to the crossbeam 21 are adjacent to each other, and the end of the first connection member 101d being close to the crossbeam 21 and the end of the first connection member 101b being close to the crossbeam 21 are adjacent to each other. That is, the ends of the two adjacent first connection members 101 being close to the crossbeam 21 are adjacent to each other such that the gap between the two first connection members 101 forms the approximately triangular shape to not only provide the certain installation space but also improve the stability of the structure. It can be understood that the number of the first connection members may be set to three, five or the like. When the number of the first connection members is equal to or more than two, the ends of the two adjacent first connection members 101 being close to the crossbeam 21 are adjacent to each other such that the gap between the two first adjacent first connection members 101 forms the approximately triangular shape.

According to an example, when the number of the first connection members 101 is multiple, the structure and shape of each first connection member 101 may be set to be the same so as to facilitate the processing and manufacturing and reduce the cost.

According to an example referring to FIG. 2, when the number of the first connection members 101 is multiple, the structure and shape of each first connection member 101 may be set to be different from each other to be compatible with different installation position so as to improve the stability of the connection between the battery pack 22 and the crossbeam 21. The specific shape of each connection member 101 can be set according to the actual installation position and requirement and is not particularly limited herewith.

According to an example referring to FIG. 12, the first connection member 101 is distributed symmetrically with respect to the cross-section 210 passing through the center of the crossbeam 21 in the length direction. According to the above-described configuration, the first connection member 101 is distributed symmetrically on the bottom side of the crossbeam 21 so as to further balance the force receiving to improve the stability of the structure and ensure the structural strength and stability of the vehicle body. In the present example, the number of the first connection member 101 is one such that the left side and the right side of this first connection member 101 is distributed symmetrically so as to make the first connection member 101 is distributed symmetrically with respect to the cross-section 210 passing through the center of the crossbeam 21 in the length direction.

According to an example referring to both FIG. 3 and FIG. 13, when the number of the first connection members 101 is two, two of the first connection members 101 are distributed symmetrically with respect to the cross-section 210 passing through the center of the crossbeam 21 in the length direction. Referring to FIG. 14, when the number of the first connection members 101 is four, four of the first connection members 101 are distributed symmetrically with respect to the cross-section 210 passing through the center of the crossbeam 21 in the length direction. It can be understood that when the number of the first connection members 101 is other value such as three, five, six or the like, these first connection members 101 are distributed symmetrically with respect to the cross-section 210 passing through the center of the crossbeam 21 in the length direction as a whole to make the crossbeam 21 to receive the force more uniformly so as to improve the structural strength and stability of the vehicle body.

Furthermore, a vehicle according to the present disclosure is provided referring to FIG. 1. The vehicle includes the battery pack 22, the vehicle body and the connection structure of a battery pack and a vehicle body 10 according to any one of the above-described example. The vehicle body includes the left stringer 232, the right stringer 231 and the crossbeam 21, wherein the left stringer 232 and the right stringer 231 are connected to the two ends of the crossbeam 21, and the battery pack 21 is connected to the crossbeam 21 via the first connection member 101. The vehicle adopts the connection structure of a battery pack and a vehicle body 10 according to the above-described example to prevent the out-of-plane deformation of the first connection member 101 and ensure the suitable structural strength and stability of the first connection member 101 so as to make the rear end of the battery pack 22 to be suitably fixed on the crossbeam 21 of the vehicle body to improve the structural strength and stability of the vehicle.

Although the respective embodiments and modifications of the present disclosure have been described above, the technical scope of the present disclosure is not limited to the above-described embodiments, and configurations in the respective embodiments and modifications within the scope not departing from the spirit of the present disclosure. It is possible to change the combination of elements, make various changes to each configuration element, or delete each configuration element. The present disclosure is not limited by the above description, and is only limited by the appended claims.

REFERENCE SIGNS LIST 10 connection structure of a battery pack and a vehicle body
101 first connection member
1010 hollow structure
11 bottom plate
121 first inclination plate
122 second inclination plate
131 first vertical plate
132 second vertical plate
141 first sticking plate
142 second sticking plate
151 first bending portion
152 second bending portion
161 first bottom sticking plate
162 second bottom sticking plate
102 second connection member
21 crossbeam
211 right support member
212 second support member
22 battery pack
231 right stringer
232 left stringer

What is claimed is:

1. A connection structure of a battery pack and a vehicle body, wherein the vehicle body includes a left stringer, a right stringer, and a crossbeam and the left stringer and the right stringer are connected to two ends of the crossbeam, comprising:
at least a first connection member configured to connect the battery pack and the crossbeam,
wherein the first connection member includes a first inclination plate and a second inclination plate arranged at intervals along a left-right direction,
the first inclination plate is positioned at a side of the second inclination plate to be close to the right stringer,
one end of each of the first inclination plate and the second inclination plate is connected to the crossbeam, and the other end of each of the first inclination plate and the second inclination plate is connected to the battery pack, a first extension plane of the first inclination plate that is the closest to the right stringer intersects the right stringer, and
a second extension plane of the second inclination plate that is the closest to the left stringer intersects the left stringer.

2. The connection structure of a battery pack and a vehicle body according to claim 1,
wherein a longitudinal cross section of the first connection member is an approximately triangular shape, and
a length of the first connection member along the left-right direction is set to be gradually decreased in a direction from the crossbeam toward the battery pack.

3. The connection structure of a battery pack and a vehicle body according to claim 2, wherein at least two of the first connection members are provided, and ends of the two adjacent first connection members being close to the crossbeam are arranged with an interval therebetween.

4. The connection structure of a battery pack and a vehicle body according to claim 2, wherein at least two of the first connection members are provided, and ends of the two adjacent first connection members being close to the crossbeam are arranged to be adjacent to each other.

5. The connection structure of a battery pack and a vehicle body according to claim 1, wherein a horizontal cross section of the first connection member passing through a center in a length direction of the crossbeam is symmetrically distributed.

6. The connection structure of a battery pack and a vehicle body according to claim 1,
wherein the first connection member includes a first bottom sticking plate for sticking to a bottom surface of the crossbeam to be fixed thereto, and the first bottom sticking plate being provided to extend in a direction from the end of the first inclination plate being close to the crossbeam to be separated from the second inclination plate, and/or
the first connection member includes a second bottom sticking plate for sticking to the bottom surface of the crossbeam to be fixed thereto, and the second bottom sticking plate being provided to extend in a direction from the end of the second inclination plate being close to the crossbeam to be separated from the first inclination plate.

7. The connection structure of a battery pack and a vehicle body according to claim 1,
wherein the first connection member further includes a first vertical plate, a left end and a right end of the first vertical plate being communicated with a front side of the second inclination plate and a front side of the first inclination plate, respectively, and/or
the first connection member further includes a second vertical plate, a left end and a right end of the second vertical plate being communicated with a rear side of the second inclination plate and a rear side of the first inclination plate, respectively.

8. The connection structure of a battery pack and a vehicle body according to claim 1,
wherein the first connection member further includes a first sticking plate for sticking to a front surface of the crossbeam to be fixed thereto, a lower side of the first sticking plate being adjacent to the first vertical plate and the first vertical plate being on the same plane with the first sticking plate, and/or the first connection member further includes a second sticking plate for sticking to a rear surface of the crossbeam to be fixed thereto, a lower side of the second sticking plate being adjacent to the second vertical plate and the second vertical plate being on the same plane with the second sticking plate.

9. The connection structure of a battery pack and a vehicle body according to claim 7,
wherein the first connection member further includes a first sticking plate for sticking to a front surface of the crossbeam to be fixed thereto, a lower side of the first sticking plate including a first bending portion bending from the bottom surface of the crossbeam toward the front surface of the crossbeam so as to transition thereto, the first bending portion continuing to the first vertical plate, and the first bending portion being provided to stick to the bottom surface and the front surface of the crossbeam to be fixed thereto, and/or
the first connection member further includes a second sticking plate for sticking to a rear surface of the crossbeam to be fixed thereto, a lower side of the second sticking plate including a second bending portion bending from the bottom surface of the crossbeam toward the rear surface of the crossbeam so as to transition thereto, the second bending portion continuing to the second vertical plate, and the second bending portion being provided to stick to the bottom surface and the rear surface of the crossbeam to be fixed thereto.

10. The connection structure of a battery pack and a vehicle body according to claim 7,
wherein when the first connection member includes a first vertical plate and a distance between the first vertical plate and the rear surface of the battery pack is equal to or smaller than a predetermined distance, a lower end of the first vertical plate connects to the rear surface of the battery pack, or
when the first connection member includes the first vertical plate and the distance between the first vertical plate and the rear surface of the battery pack is larger than the predetermined distance, the connection structure of a battery pack and a vehicle body further includes a second connection member, wherein the lower end of the first vertical plate connects to the second connection member, and the second connection member connects to the rear surface of the battery pack.

11. The connection structure of a battery pack and a vehicle body according to claim 1, wherein the first connection member includes a hollow structure, and an end of the hollow structure being close to the crossbeam is open.

12. A vehicle, comprising:
a battery pack;
a vehicle body; and
a connection structure of a battery pack and a vehicle body according to claim 1,
wherein the vehicle body includes a left stringer, a right stringer, and a crossbeam,
the left stringer and the right stringer are connected to two ends of the crossbeam respectively, and
the battery pack is connected to the crossbeam via the first connection member.

* * * * *